United States Patent [19]

Van Der Mark

[11] 4,431,993
[45] Feb. 14, 1984

[54] THRESHOLD VOLTAGE GENERATOR

[75] Inventor: Jacobus Van Der Mark, Apeldoorn, Netherlands

[73] Assignee: Hollandse Signaalapparaten B.V., Hengelo, Netherlands

[21] Appl. No.: 228,529

[22] Filed: Jan. 26, 1981

[30] Foreign Application Priority Data

Feb. 4, 1980 [NL] Netherlands .................. 8000674

[51] Int. Cl.³ .............................................. G01S 9/00
[52] U.S. Cl. .................. 343/5 CE; 343/7 A; 307/358
[58] Field of Search ............. 343/5 NQ, 5 SM, 5 CE, 343/5 CF, 7 A; 307/358; 375/76; 455/303

[56] References Cited

U.S. PATENT DOCUMENTS

| | | | |
|---|---|---|---|
| 3,176,293 | 3/1965 | Nolen et al. ............... | 343/7 A |
| 3,638,183 | 1/1972 | Progler et al. ............. | 307/358 |
| 3,832,577 | 8/1974 | Harr ........................ | 307/358 X |
| 3,991,379 | 11/1976 | Chadwick et al. .......... | 307/358 X |
| 4,067,013 | 1/1978 | Smith ....................... | 455/303 |
| 4,117,538 | 9/1978 | Shrader et al. ............ | 343/5 NQ X |
| 4,156,202 | 5/1979 | Takahashi .................. | 307/358 X |
| 4,175,256 | 11/1979 | Dolikian ................... | 307/358 X |
| 4,219,812 | 8/1980 | Rittenbach ................ | 343/5 NQ X |

*Primary Examiner*—Maynard R. Wilbur
*Assistant Examiner*—M. R. Gordon
*Attorney, Agent, or Firm*—Thomas A. Briody; William J. Streeter; Edward W. Goodman

[57] ABSTRACT

Threshold circuit for selecting video signals derived from small stationary and moving objects amidst an abundance of clutter in a harbor area. The threshold voltage generator (1) of this circuit is suitable for detecting the temporal average $\Delta P$ of the positive peak value and the temporal average $\Delta N$ of the negative peak value from the AC component of the applied video voltage ($V_{DC}+V_{AC}$) and for generating modified voltages $(1+k)(V_{AC}-\Delta P)$ and $k(-V_{AC}-\Delta N)$. The modified voltages together with the inverted video voltage are combined to form the threshold voltage $V = V_{DC} + \Delta P + k(\Delta P + \Delta N)$ being k times the average peak-peak value above the average peak value of the video voltage, where k is a constant.

5 Claims, 8 Drawing Figures

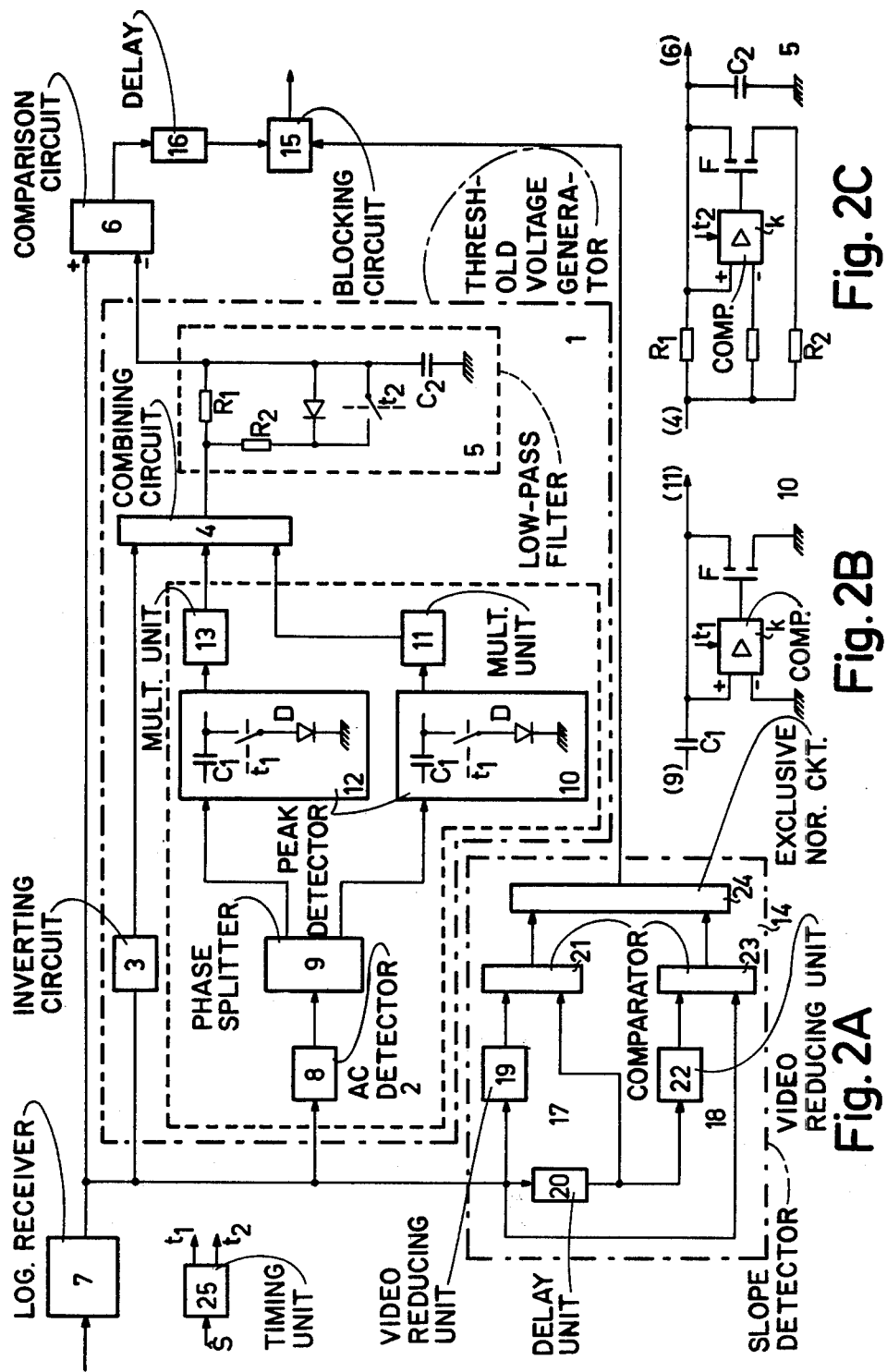

THRESHOLD VOLTAGE GENERATOR

BACKGROUND OF THE INVENTION

The invention relates to a threshold circuit for video signals, as obtained with a radar apparatus, for example.

Such a threshold circuit is widely known and is used for selecting strong video signals from other weaker video signals, while a large amount of clutter signals are eliminated. The term clutter signals is used to describe the collection of unwanted echo signals which smear the radar picture and render it impossible to identify wanted echo signals. Usually of interest are echo signals from moving targets; the remaining echo signals are therefore labelled as clutter when can be eliminated by means based on MTI and pulse Doppler techniques. This is not the case, however, with a harbor radar used to observe activities in the harbor area along and on the water. Here, not only of interest are echo signals from moving targets, but also from stationary targets; not only large structures, such as moored vessels and harbour buildings, but from smaller objects as well, such as buoys and beacons. In particular, the latter type of objects are difficult to identify on a radar screen amidst an abundance of clutter signals from rain and/or the water surface. In a harbor radar, the video signals from clutter cannot be eliminated by the abovementioned means, as this would also suppress wanted video signals from stationary targets. In the case in question, the clutter signals should be eliminated by means of a threshold circuit, where it is of great importance to select a suitable threshold level, as pointed out in Skolnik's Radar Handbook, Chapter 5.8. A too high threshold voltage constitutes the risk that video signals of, say, buoys and beacons are eliminated with the clutter signals, whereas a too low threshold voltage would tend to designate an excess of video signals as originating from genuine targets, thus causing an excessive false alarm rate. It is therefore important to select such a threshold value so as to result in a maximum number of detections of genuine targets with maximum clutter elimination and a minimum false alarm rate.

Since the clutter strength is not constant, but is dependent, on the one hand, upon factors usually varying slowly in value, such as wind-force, wind direction, harbor-traffic density, and length of the water waves, and on the other hand, upon factors which may vary rapidly in local places, such as the radar bearing relative to the direction of the waves, variations in wind-force and bow and stern waves, it is advantageous to adapt the threshold voltage continuously to the varied circumstances during the radar observations.

SUMMARY OF THE INVENTION

The present invention has for its object to provide a solution for the above problem. According to the invention, the threshold circuit as set forth in the opening paragraph comprises a threshold voltage generator containing a detection and multiplication circuit, a combining circuit connected to the detection and multiplication circuit, and a low-pass filter connected to the combining circuit, whereby the detection and multiplication circuit detects, from the applied video voltage $(V_{DC}+V_{AC})$, both the temporal average $\Delta P$ of the positive peak value of the AC component $V_{AC}$ for modifying $V_{AC}$ to obtain a first output voltage $(1+k)(V_{AC}-\Delta P)$, where k is a predefined factor, and the temporal average $\Delta N$ of the negative peak value of the AC component $V_{AC}$ for modifying the inverted AC component $(-V_{AC})$ to obtain a second output voltage $k(-V_{AC}-\Delta N)$; the two output voltages, together with the inverted video voltage $(-V_{DC}-V_{AC})$ are applied to the combining circuit and the low-pass filter connected thereto to produce a threshold voltage:

$$V = V_{DC} + \Delta P + k(\Delta P + \Delta N) = V_{DC} + \Delta P + k \cdot V_{pp},$$

where $V_{pp}$ is the average peak-peak value of the AC component in the video voltage. The threshold level so obtained is a defined factor k times the average peak-peak value $V_{pp}$ above the average peak value of the video voltage.

Such a threshold circuit enables the elimination of the phenomena of continuous occurrence, like clutter, and to retain the phenomena of incidental occurrence.

DESCRIPTION OF THE DRAWINGS

The invention will now be described with reference to the accompanying figures, of which:

FIGS. 2A-2C show an embodiment of a video processing unit with a threshold circuit, illustrating two units in detail.

DESCRIPTION OF THE PREFERRED EMBODIMENT

Figure 1A:
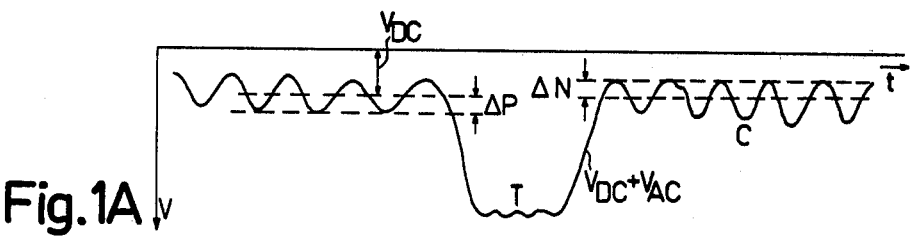
FIGS. 1A and 1B show waveforms of the measured video signal and the threshold voltage produced with the separate voltage components.

FIG. 1A shows the variation in the video voltage to be processed in inverted form over a certain period of time. This voltage, obtained from clutter signals (C) and a real-target echo signal (T), can be split into a DC component $V_{DC}$ and an AC component $V_{AC}$. The object of the present invention is to generate such a threshold voltage V as to result in a maximum number of detections of genuine targets with maximum clutter elimination and a minimum false alarm rate. In view of the fact that the strength of the clutter signals from the water surface can vary frequently and abruptly, the desired threshold voltage V is such that the difference between the threshold voltage V and the average peak value $(V_{DC}+\Delta P)$ of the clutter-fouled video signal is a function of the average peak-peak voltage of the clutter signals $V_{pp}=\Delta P+\Delta N$. The threshold voltage V can therefore be expressed by: $V=V_{DC}+\Delta P+k \cdot V_{pp}$, where k is a suitable constant. Hence, the greater the decrease in clutter activity, the closer the approach of the threshold level to the video signal level. In the embodiment of FIG. 2A, the numeral 1 denotes a threshold voltage generator producing the desired voltage $V=V_{DC}+\Delta P+k \cdot V_{pp}$.

Threshold voltage generator 1, consisting of a detection and multiplication circuit 2, an inverting circuit 3, a combining circuit 4 and a low-pass filter 5, delivers the desired threshold voltage to a gate circuit 6 for comparison with the video voltage.

The video voltage, which in the embodiment in question is derived from a logarithmic receiver 7, is applied to the inverting circuit 3 and delivered as $-(V_{DC}+V_{AC})$ to combining circuit 4. Also the video voltage is applied to the detection and multiplication circuit 2 in which an AC detector 8, having a highpass filter characteristic, passes the AC component $V_{AC}$ of e video voltage. A phase splitter 9, connected to AC detector 8, generates two output signals, one signal being in phase and the other in antiphase with the input signal.

The in-phase AC signal ($V_{AC}$) is fed to a first peak detector 10 and is modified to form the signal $V_{AC} - \Delta P$, where $\Delta P$ is the temporal average of the positive peak value of the AC component $V_{AC}$ (see FIG. 1A). FIG. 2B shows an embodiment of a peak detector consisting of a capacitor $C_1$ and an equivalent diode circuit D. Diode circuit D of this embodiment is grounded FET switch F, which is controlled by the output signal of a grounded comparator K. After multiplication of the voltage from peak detector 10 by a factor $(1+k)$ in unit 11 (see FIG. 2B), where k is a redefined value, the resulting voltage $(1+k)(V_{AC} - \Delta P)$ is fed to combining circuit 4.

The out-of-phase AC signal ($-V_{AC}$) is applied to a second peak detector 12. This detector, which may be of the same type as the first peak detector 10, is to determine the temporal average $\Delta N$ of the negative peak value of the AC signal $V_{AC}$ (see FIG. 1A) and thereby modify the AC component to form the voltage $V_{AC} - \Delta N$. After multiplication by a factor k in unit 13, the latter voltage is also fed to combining circuit 4. In consequence of the three supplied voltages $V_{DC} - V_{AC}$, $(1+k)(V_{AC} - \Delta P)$ and $-k(V_{AC} + \Delta N)$, combining circuit 4 (see FIG. 1B) produces an output voltage: $V_1 = -\{V_{DC} + \Delta P + k(\Delta P + \Delta N)\}$. Since a peak detector also makes a fast response to variations in the video voltage with the detection of echoes from genuine targets, the output voltage of combining circuit will therefore follow the variation in the peak values of the video voltage at a difference level of $kV_{pp}$. Hence, also video signals from genuine targets will remain below the output voltage of circuit 4, so that this output voltage is not simply suitable as the threshold voltage! This situation is however prevented by connecting a low-pass filter 5 to combining circuit 4. In this way the clutter, which behaves as a continuous phenomenon (with slow variations in the peak voltage level), will remain fully below the output voltage of low-pass filter 5. On the other hand, a video signal of a genuine target, which behaves as an incidental phenomenon (with usually rapid variations in the voltage level) will ascend rapidly above the slowly increasing output voltage of low-pass filter 5. For this reason, the output voltage of low-pass filter 5 is suitable to function as the threshold voltage.

Figure 1B:
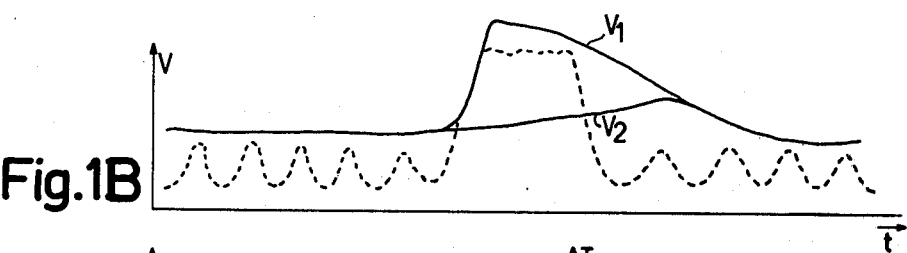

A threshold voltage generator which can be used to advantage, is obtained when the low-pass filter 5 is polarity-dependent, that is, if the filter time constant is large with the increase of the threshold voltage but small with the decrease of this voltage; this amounts to a slow rise of the threshold voltage in the presence of a video signal from a genuine target, but a very rapid fall of the threshold voltage after the disappearance of the signal (see threshold voltage $V_2$ in FIG. 1B). Such a low-pass filter can be regarded as an RC circuit, of which the resistance branch is formed by a parallel circuit of both a high resistance $R_1$ and a series circuit of low resistance $R_2$ with an equivalent diode circuit D. Diode circuit D is so incorporated that, if the filter input voltage is greater than the output voltage, the diode circuit is blocked and, conversely, if the filter input voltage is smaller, the circuit is conducting. Also in this case, diode circuit D may consist of a FET switch (F), controlled by a comparator K.

The filter output voltage can now be applied as threshold voltage to gate circuit 6. A suitable gate circuit is, for instance, a linear amplifier, of which the output voltage is proportional to the difference between the applied video voltage and the threshold voltage, provided the video voltage is greater than the threshold voltage. However, in the embodiment in question, where the video signals are obtained from a logarithmic receiver 7, an amplifier having an exponential gain factor is used as gate circuit 6.

To obtain a better range resolution in the echo detection, it is advantageous to blank the video signal during its rise and fall time. The threshold circuit 1 is thereto provided with a slope detector 14 for determining the slope of the video signal and a blocking circuit 15 to which the output of gate circuit 6 is connected via a delay means 16 (with a fixed delay of $\Delta T_2$), the blocking circuit 15 being controlled by the output signal of slope detector 14. In the embodiment in question, slope detector 14 comprises means 17 for detecting a leading edge having a slope that exceeds a predefined value, and means 18 for detecting a trailing edge having a slope whose absolute value also exceeds the predefined value. In this embodiment, means 17 comprises a unit 19 for decreasing the video signal level by $\Delta V$, giving signal A, and a unit 20 for delaying the video signal by $\Delta T_1$, giving signal B. A comparator 21 fed with the output voltages of units 19 and 20 establishes whether and, if so, for how long the leading edge of signal A extends above the delayed signal B (see shaded part in FIG. 3A) and hence, whether the leading edge of a target echo meets the slope condition in order to be blanked. Similarly, it can be established whether the trailing edge meets the slope condition in order to be blanked. Means 18, therefore, comprises, in addition to unit 20, also a unit 22, connected to unit 20, for delaying the applied video signal by a time $\Delta T_1$ and for decreasing the level of this signal by $\Delta V$, giving signal E. The directly applied video signal G and signal E are applied to a second comparator 23 to establish whether and, if so, for how long the trailing edge of signal E extends above the directly applied signal G (see FIG. 3B), and hence whether the trailing edge of a target echo meets the slope condition in order to be blanked. The output signals of the two comparators 21 and 23 are combined in an EXCLUSIVE-NOR circuit 24 (see FIG. 3C) forming a control signal H for blocking circuit 15 to blank the video signal during the period the slope of the video voltage exceeds a certain value. The normal value of the slope is dependent upon the applied values $\Delta V$ and $\Delta T_1$.

Figure 3A:
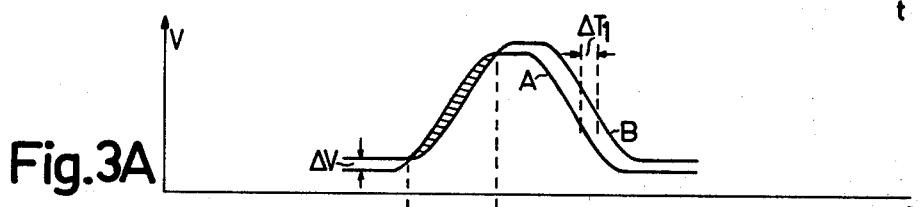
FIGS. 3A-3C are diagrams useful in understanding the operation of the unit shown in FIG. 2A.
Figure 3B:
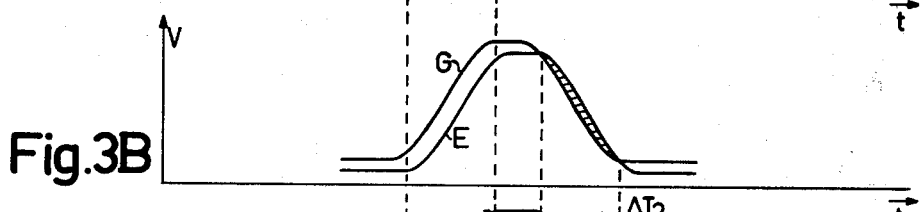
Figure 3C:
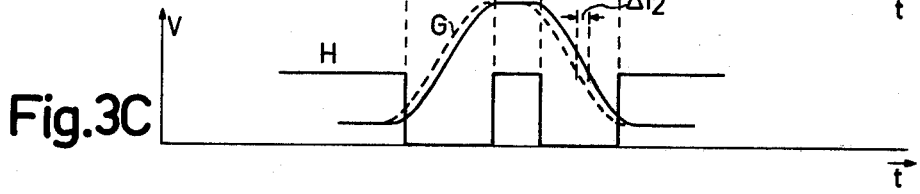

From FIGS. 3A and 3C it can be seen that control signal H of circuit 24 appears a time $\Delta T_2$ (where $\Delta T_2 < \Delta T_1$) later than the start of the rising edge of the video signal G; a similar situation occurs with the falling edge of the video signal. For this reason a video signal obtained from gate circuit 6 is delayed by time $\Delta T_2$ before it is applied to blocking circuit 15. The time $\Delta T_2$ can be determined empirically.

During the generation of the transmitter pulse, peak detectors 10 and 12 are switched off and the FET switch F in the low-pass filter 5 is closed, permitting a faster adaptation of the filter-produced threshold voltage to the strong video signal directly after the transmitter pulse. The required signals $t_1$ and $t_2$ are derived from a timing unit 25 controlled by a synchronization signal S.

I claim:

1. Circuitry for thresholding applied video signals ($V_{DC}+V_{AC}$) from a radar receiver, characterized in that the circuitry comprises:

a comparison circuit connected to said receiver and operating with a threshold voltage;

a circuit connected to said receiver for inverting the applied video signals;

AC-detecting and phase-splitting means connected to said receiver for separately producing an in-phase AC component ($V_{AC}$) and an out-of-phase AC component ($-V_{AC}$) of the applied video signals ($V_{DC}+V_{AC}$);

first peak detecting and weighting means connected to said AC-detecting and phase-splitting means for producing the output voltage $V_{AC}-\Delta P$ and for modifying the latter voltage to $(1+k)(V_{AC}-\Delta P)$, where the voltage component $\Delta P$ is the temporal average of the positive peak value of the supplied signal $V_{AC}$, and k is a predefined factor;

second peak-detecting and weighting means connected to said AC-detecting and phase-splitting means for producing the output voltage $(-V_{AC}-\Delta N)$ and for modifying the latter voltage to $k(-V_{AC}-\Delta N)$, where the voltage component $\Delta N$ is the temporal average of the negative peak value of the supplied signal $(-V_{AC})$ and k is said predefined factor; and combining and low-pass filtering means connected to said inverting circuit and to said first and second peak-detecting and weighting means for producing an output voltage $V_{DC}+\Delta P+k(\Delta P+\Delta N)$ and for low frequency filtering of said output voltage to obtain the desired threshold voltage for the comparison circuit.

2. Circuitry for thresholding video signals ($V_{DC}+V_{AC}$) as claimed in claim 1, characterized in that the filter time constant of the low-pass filter is polarity-dependent for rapidly cancelling a temporary increase of the threshold voltage V.

3. Circuitry for thresholding video signals ($V_{DC}+V_{AC}$) as claimed in claim 1, whereby the radar receiver functions as a logarithmic receiver, characterized in that the comparison circuit functions as an exponential amplifier having an output voltage proportional to an exponential function, whose exponent is defined by the difference between said threshold voltage and the receiver-supplied video output voltage.

4. Circuitry for thresholding video signals ($V_{DC}+V_{AC}$) as claimed in claim 1 or 2, characterized in that the circuitry comprises a blocking circuit, connected to the comparison circuit via delay means, and further comprises a slope detector for generating a control signal for the blocking circuit to block the video signal transfer during the period a predefined slope value of the applied video signal is exceeded.

5. Circuitry for thresholding video signals ($V_{DC}+V_{AC}$) as claimed in claim 4, characterized in that the slope detector comprises:

means for generating said control signal during the time the applied video signal decreased by a defined value $\Delta V$ extends above the applied video signal delayed by a given time $\Delta T_1$; means for generating said control signal during the time the original applied video signal delayed by said time $\Delta T_1$ and decreased by said voltage $\Delta V$; and means for delaying the applied video signal by a time $\Delta T_2$, where $\Delta T_2 < \Delta T_1$, which delayed applied video signal is fed from the threshold circuit to the blocking circuit.

* * * * *